US011579752B1

(12) United States Patent
Sarria, Jr.

(10) Patent No.: US 11,579,752 B1
(45) Date of Patent: Feb. 14, 2023

(54) AUGMENTED REALITY PLACEMENT FOR USER FEEDBACK

(71) Applicant: Sony Interactive Entertainment Inc., Tokyo (JP)

(72) Inventor: Mario M. Sarria, Jr., San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/381,091

(22) Filed: Jul. 20, 2021

(51) Int. Cl.
| | |
|---|---|
| *G06F 3/0482* | (2013.01) |
| *G06T 19/00* | (2011.01) |
| *G06F 3/01* | (2006.01) |
| *G06F 3/04815* | (2022.01) |
| *G06N 20/00* | (2019.01) |
| *A63F 13/537* | (2014.01) |
| *G06F 3/04845* | (2022.01) |
| *G06V 20/20* | (2022.01) |

(52) U.S. Cl.
CPC .......... *G06F 3/0482* (2013.01); *A63F 13/537* (2014.09); *G06F 3/013* (2013.01); *G06F 3/017* (2013.01); *G06F 3/04815* (2013.01); *G06F 3/04845* (2013.01); *G06N 20/00* (2019.01); *G06T 19/006* (2013.01); *G06V 20/20* (2022.01); *A63F 2300/8082* (2013.01); *G06T 2200/24* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 2012/0154557 | A1 | 6/2012 | Perez et al. |
| 2018/0157398 | A1 | 6/2018 | Kaehler et al. |
| 2019/0391716 | A1* | 12/2019 | Badr ..................... G06F 1/1698 |
| 2020/0089323 | A1 | 3/2020 | Chang et al. |
| 2020/0222871 | A1 | 7/2020 | Taube et al. |

(Continued)

OTHER PUBLICATIONS

PCTUS2022036268, Notification of Transmittal of the International Search Report and the Written Opinion of the International Searching Authority, or the Declaration, PCT/ISA/220, and the International Search Report, PCT/ISA/210, dated Dec. 16, 2022.

*Primary Examiner* — Roland J Casillas
(74) *Attorney, Agent, or Firm* — Penilla IP, APC

(57) ABSTRACT

Methods and systems are provided for generating augmented reality (AR) scenes where the AR scenes include one or more artificial intelligence elements (AIEs) that are rendered as visual objects in the AR scenes. The method includes generating an AR scene for rendering on a display; the AR scene includes a real-world space and virtual objects projected in the real-world space. The method includes analyzing a field of view into the AR scene; the analyzing is configured to detect an action by a hand of the user when reaching into the AR scene. The method includes generating one or more AIEs rendered as virtual objects in the AR scene, each AIE is configured to provide a dynamic interface that is selectable by a gesture of the hand of the user. In one embodiment, each of the AIEs is rendered proximate to a real-world object present in the real-world space; the real-world object is located in a direction of where the hand of the user is detected to be reaching when the user makes the action by the hand.

18 Claims, 12 Drawing Sheets

(56) References Cited

U.S. PATENT DOCUMENTS

| | | |
|---|---|---|
| 2020/0289937 A1* | 9/2020 | Osman .................... A63F 13/47 |
| 2021/0096726 A1* | 4/2021 | Faulkner ............... G06F 1/1686 |
| 2022/0057922 A1 | 2/2022 | Wang et al. |
| 2022/0083198 A1 | 3/2022 | Kaehler et al. |

* cited by examiner

User Captured Physical Actions Table 702

| Physical Action Category 704 | General Description 706 |
|---|---|
| Body Movement data | Hand movement, head movement, body range of motion, reach direction, reach distance, body language gestures, attempted movement |
| Eye gaze data | Gaze direction, view location, game content |
| Voice capture data | Voice inflection, voice intensity, emotion, mood, sentiment |
| Face Capture data | Intensity, emotion, mood, sentiment |
| Controller input data | Intensity, emotion, mood, sentiment, gestures |

FIG. 7

AUGMENTED REALITY PLACEMENT FOR USER FEEDBACK

BACKGROUND

1. Field of the Disclosure

The present disclosure relates generally to generating an augmented reality (AR) scene and more particularly to methods and systems for generating one or more artificial intelligence elements (AIEs) in the AR scene that are selectable by the user.

2. Description of the Related Art

Augmented reality (AR) technology has seen unprecedented growth over the years and is expected to continue growing at a compound annual growth rate. AR technology is an interactive three-dimensional (3D) experience that combines a view of the real-world with computer-generated elements (e.g., virtual objects) in real-time. In AR simulations, the real-world is infused with virtual objects and provides an interactive experience. With the rise in popularity of AR technology, various industries have implemented AR technology to enhance the customer experience. Some of the industries include, for example, video games, shopping & retail, education, entertainment, healthcare, real estate, virtual assistance, etc.

For example, a growing trend in the video game industry is to incorporate AR gaming where the AR game superimposes a pre-created environment on top of a user's actual environment. AR gaming enhances the gaming experience of the user which keeps the games interesting since new AR scenes can be generated based on the real-world environment of the user. In another example, a growing trend is to incorporate AR technology into sophisticated tools and operations that may assist a user with various personal tasks, e.g., navigation & visual guidance, etc. Unfortunately, some users may find that current AR technology that are used in assisting users are not personalized enough to assist the user with their day-to-day tasks.

It is in this context that implementations of the disclosure arise.

SUMMARY

Implementations of the present disclosure include methods, systems, and devices relating to generating augmented reality (AR) scenes for rendering on a display. In some embodiments, methods are disclosed to enable one or more artificial intelligence elements (AIEs) to be generated and rendered as virtual objects in the AR scene where each AIE is configured to provide a dynamic interface that is selectable by a gesture of the hand of the user. For example, a user may be wearing AR goggles (e.g., AR head mounted display) and immersed in an AR environment that includes both real-world objects and virtual objects. While interacting with various AR scenes of the AR environment, the system may be configured to detect an action by a hand of the user when reaching into the AR scene. When the hand of the user is detected to be reaching toward a real-world object (e.g., video game controller, mobile phone, book, streaming device controller, etc.), the system is configured to generate one or more AIEs proximate to the real-world object that the user is reaching toward. In one embodiment, each AIE is configured to provide a dynamic interface that is selectable by the user where the dynamic interface provides information related to the real-world object. Since the AR scenes can include various real-world objects, the methods disclosed herein outline ways of generating one or more AIEs related to a real-world object to provide the user with information related to the real-world object and to use the features that are associated with the real-world object.

Thus, as a user interacts with the AR scenes in an AR environment, the actions of the user are monitored and the system is configured to detect and determine the real-world object that the hand of the user is reaching toward so that AIEs can be rendered proximate to the real-world. In this way, as the user interacts with the AR scene, real-world objects that may be of interest to the user may have AIEs rendered proximate to the real-world objects and each of the AIEs may have a corresponding dynamic interface that provides information related to the real-world object. Thus, users can find out information related to a real-world object in an AR scene seamlessly and efficiently by selecting the respective AIE using their hand. In some embodiments, the AIEs that are selected for generating in the AR scene can be based on a model and the selected AIEs can be based on the interests and preferences of the user. In one embodiment, the model can use as inputs a profile of the user; user captured physical actions, and contextual data to select which AIEs to use for generating in the AR scene.

In one embodiment, a computer-implemented method is provided. The method includes generating an augmented reality (AR) scene for rendering on a display, the AR scene includes a real-world space and virtual objects projected in the real-world space. The method includes analyzing a field of view into the AR scene; the analyzing is configured to detect an action by a hand of the user when reaching into the AR scene. The method includes generating one or more artificial intelligence elements (AIEs) rendered as virtual objects in the AR scene, each AIE is configured to provide a dynamic interface that is selectable by a gesture of the hand of the user. In one embodiment, each of the AIEs is rendered proximate to a real-world object present in the real-world space; the real-world object is located in a direction of where the hand of the user is detected to be reaching when the user makes the action by the hand. In this way, AIEs are dynamically generated and placed proximate to real-world objects to provide a dynamic interface that provides information related to the real-world object so that the user can seamlessly obtain information or use features that are associated with the real-world object.

In another embodiment, a system for displaying an AR scene is provided. The system includes an AR head mounted display (HMD); said AR HMD includes a display for rendering the AR scene. In one embodiment, the AR scene includes a real-world space and virtual objects projected in the real-world space. The system includes a processing unit associated with the AR HMD for processing one or more artificial intelligence elements (AIEs) rendered as virtual objects in the AR scene. In one embodiment, each AIE is configured to provide a dynamic interface that is selectable by a gesture of a hand of a user. In one embodiment, each of the AIEs is rendered proximate to a real-world object present in the real-world space; the real-world object is located in a direction of where the hand of the user is detected to be reaching when the user makes an action by the hand.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 7 illustrates an embodiment of a user captured physical actions table illustrating various physical actions that are captured while the user is interacting with the AR environment, in accordance with an implementation of the disclosure.

DETAILED DESCRIPTION

Figure 1A:
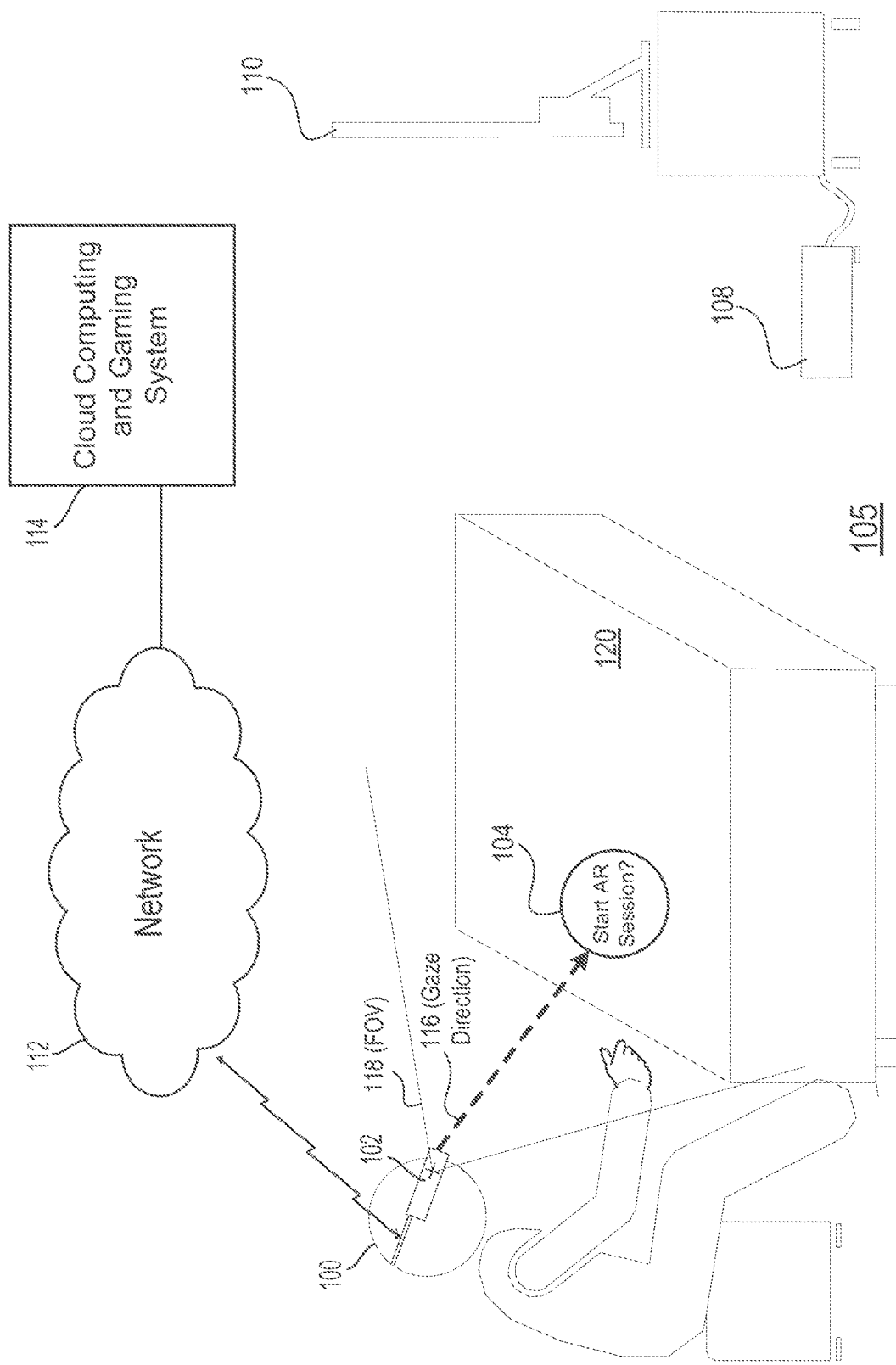
FIG. 1A illustrates an embodiment of a system for interaction with an augmented reality (AR) environment via an AR head-mounted display (HMD), in accordance with an implementation of the disclosure.

The following implementations of the present disclosure provide methods, systems, and devices for generating augmented reality (AR) scenes for a user of an AR head mounted display (HMD) and generating one or more artificial intelligence elements (AIEs) that are rendered as visual objects in the AR scenes. In one embodiment, each generated AIE is configured to provide a dynamic interface that is selectable by the user where the dynamic interface provides information related to the real-world object. In particular, while a user is interacting with an AR scene, one or more AIEs are generated and rendered proximate the hand of the user and to the real-world objects that are present in the real-world space. As used herein, the term "AIEs" should be broadly understood to refer to rendered virtual objects in the AR scene where each AIE is configured to provide a dynamic interface that is selectable by a gesture of the hand of the user. In one embodiment, the dynamic interface associated with the corresponding AIE may provide information related to the real-world objects that are present in the real-world space of the user. Accordingly, as the AIEs are dynamically generated and placed proximate to the hand of the user and proximate to real-world objects, this enables an enhanced and improved AR experience for a user since the AIEs provide information related to the real-world object and facilitates a way for the user to use the features that are associated with the real-world object. This allows the user to quickly obtain information related to the real-world object quickly and efficiently since the information can be accessible by selecting the AIE. In turn, this can enhance the AR experience for users who may want a seamless way to navigate an AR environment while quickly accessing information related to a real-world object.

By way of example, in one embodiment, a method is disclosed that enables generating AR scenes and generating one or more AIEs that are rendered as virtual objects proximate to real-world objects in the AR scenes. The method includes generating an augmented reality AR scene for rendering on a display, the AR scene includes a real-world space and virtual objects projected in the real-world space. In one embodiment, the method may further include analyzing a field of view into the AR scene. In one example, the analyzing is configured to detect an action by a hand of the user when reaching into the AR scene. In another embodiment, the method may include generating one or more AIEs rendered as virtual objects in the AR scene. In one example, each AIE is configured to provide a dynamic interface that is selectable by a gesture of the hand of the user. In another example, each of the AIEs is rendered proximate to a real-world object present in the real-world space. In one embodiment, the real-world object is located in a direction of where the hand of the user is detected to be reaching when the user makes the action by the hand. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for generating AR scenes and generating one or more AIEs for rendering as virtual objects proximate to real-world objects in the AR scenes. For example, a user may be using AR goggles to interact in an AR environment which includes various AR scenes generated by a cloud computing and gaming system. While viewing and interacting with the AR scenes through the display of the AR goggles, the system is configured to analyze the field of view (FOV) into the AR scene and detect an action by a hand of the user when reaching into the AR scene.

In one embodiment, the system is configured to identify which one of the real-world objects in the AR scene the user is reaching toward for rendering the corresponding AIEs proximate to the real-world object. In one embodiment, the selection of AIEs for rendering in the AR scene is selected based on a model. In some embodiments, the model may be able to receive as inputs a profile of the user; user captured physical actions, and contextual data. In other embodiments, each AIE is configured to provide a dynamic interface which can provide information related to its corresponding real-world object. In other embodiments, each AIE is configured to provide a dynamic interface which can allow the user to use the features that are associated with the real-world object. In this way, users are provided with seamless and efficient way of accessing information related to the real-world objects since the information can be accessed quickly by viewing or selecting the dynamic interface associated with the AIE.

With the above overview in mind, the following provides several example figures to facilitate understanding of the example embodiments.

FIG. 1A illustrates an embodiment of a system for interaction with an augmented reality (AR) environment via an AR head-mounted display (HMD) 102, in accordance with implementations of the disclosure. As used herein, the term "augmented reality" (AR) generally refers to user interaction with an AR environment where a real-world environment is enhanced by computer-generated perceptual information (e.g., virtual objects). An AR environment may include both real-world objects and virtual objects where the virtual objects are overlaid onto the real-world environment to enhance the experience of the user 100. In one embodiment, the AR scenes of an AR environment can be viewed through a display of a device such as an AR HMD, mobile phone, or any other device in a manner that is responsive in real-time to the movements of the AR HMD (as controlled by the user) to provide the sensation to the user of being in the AR environment. For example, the user may see a three-dimensional (3D) view of the AR environment when facing in a given direction, and when the user turns to a side and thereby turns the AR HMD likewise, and then the view to that side in the AR environment is rendered on the AR HMD.

As illustrated in FIG. 1A, a user 100 is shown physically located in a real-world space 105 wearing an AR HMD 102 to interact with an AIE 104 that is rendered in an AR scene of the AR environment. In one embodiment, the AR HMD 102 is worn in a manner similar to glasses, goggles, or a helmet, and is configured to display AR scenes, video game content, or other content to the user 100. The AR HMD 102 provides a very immersive experience to the user by virtue of its provision of display mechanisms in close proximity to the user's eyes. Thus, the AR HMD 102 can provide display regions to each of the user's eyes which occupy large portions or even the entirety of the field of view of the user, and may also provide viewing with three-dimensional depth and perspective.

In some embodiments, the AR HMD 102 may include an externally facing camera that is configured to capture images of the real-world space of the user 100 such as real-world objects that may be located in the real-world space 105 of the user. In some embodiments, the images captured by the externally facing camera can be analyzed to determine the location/orientation of the real-world objects relative to the AR HMD 102. Using the known location/orientation of the AR HMD 102, the real-world objects, and inertial sensor data from the AR HMD, the physical actions and movements of the user can be continuously monitored and tracked during the user's interaction.

In some embodiments, the AR HMD 102 may provide a user with a field of view (FOV) 118 into the AR scene. Accordingly, as the user 100 turns their head and looks toward different regions within the real-world space 105, the AR scene is updated to include any additional virtual objects and real-world objects that may be within the FOV 118 of the user 100. In one embodiment, the AR HMD 102 may include a gaze tracking camera that is configured to capture images of the eyes of the user 100 to determine the gaze direction 116 of the user 100 and the specific virtual objects or real-world objects that the user 100 is focused on. Accordingly, based on the FOV 118 and the gaze direction 116 of the user 100, the system may detect specific actions by a hand of the user when reaching into the AR scene, e.g., user reaching toward a mobile phone that is lying on the coffee table.

As illustrated in the example shown in FIG. 1A, the gaze direction 116 of the user 100 is focused on a generated AIE 104 (e.g., Start AR Session?) that is selectable by the user. In the illustrated example, the AR scene may include the generated AIE 104 that is rendered as a virtual object in the AR scene and various real-world objects (e.g., coffee table 120, computer 108, display 110) since the real-world objects are within the FOV 118 of the user. In some embodiments, the AIE 104 is configured to provide a dynamic interface that is selectable by a gesture of the hand of the user 100. In the illustrated example, if the user 100 touches the dynamic interface, an AR session may initiate and the user 100 can proceed and explore other features provided by the AR environment. In some embodiments, the user may select the dynamic interface of an AIE by various physical actions such as pointing, tapping, touching, eye gaze, voice command, etc.

In other implementations, the AR HMD 102 can be wirelessly connected to a computer 108. The computer 108 can be any general or special purpose computer known in the art, including but not limited to, a gaming console, personal computer, laptop, tablet computer, mobile device, cellular phone, tablet, thin client, set-top box, media streaming device, etc. In some implementations, the computer 108 can be configured to execute a video game, and output the video and audio from the video game for rendering by the AR HMD 102. In some implementations, the computer 108 is configured to execute any other type of interactive application (e.g., AR scenes) that provides a virtual space/environment that can be viewed through an AR HMD. In some implementations, the AR HMD 102 may also communicate with the computer through alternative mechanisms or channels, such as via a network 112 to which both the AR HMD 102 and the computer 108 are connected via a modem and router.

In the illustrated implementation, the AR HMD 102 is wirelessly connected to a cloud computing and gaming system 114 over a network 112. In one embodiment, the cloud computing and gaming system 114 maintains and executes the AR scenes and video game being played by the user 100. In some embodiments, the cloud computing and gaming system 114 is configured to receive inputs from the AR HMD 102 over the network 112. The cloud computing and gaming system 114 is configured to process the inputs to affect the state of the AR scenes of the AR environment. The output from the executing AR scenes, such as virtual objects, real-world objects, video data, audio data, and user interaction data, is transmitted to the AR HMD 102. In other implementations, the AR HMD 102 may communicate with the cloud computing and gaming system 114 wirelessly through alternative mechanisms or channels such as a cellular network.

Figure 1B:
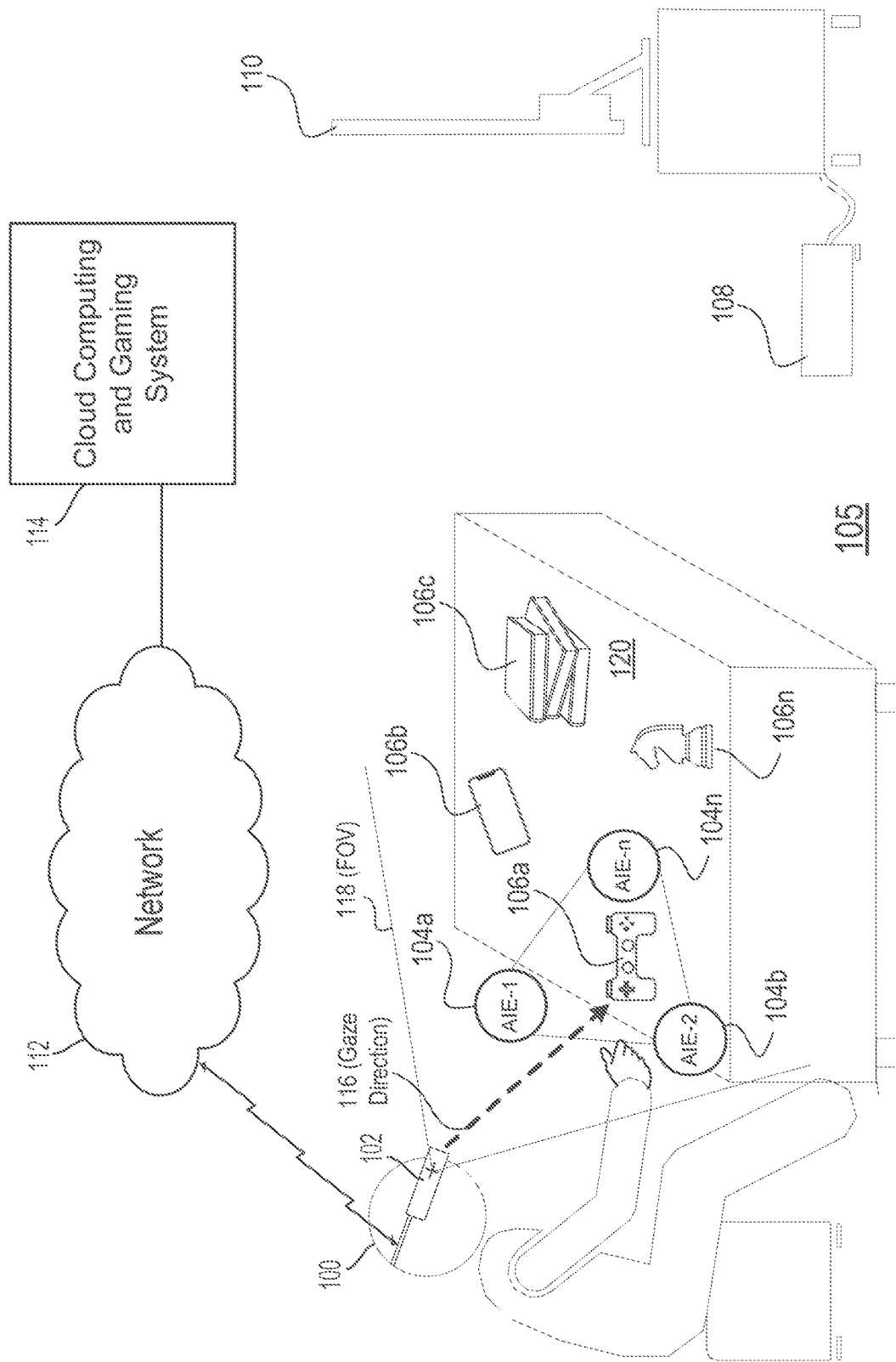
FIG. 1B illustrates an embodiment of the system for interaction with an AR environment via an AR HMD shown in FIG. 1A illustrating a plurality of real-world objects on the surface of the coffee table, in accordance with an implementation of the disclosure.

FIG. 1B illustrates an embodiment of the system for interaction with an augmented reality (AR) environment via an AR HMD 102 shown in FIG. 1A illustrating a plurality of real-world objects 106a-106n on the surface of the coffee table 120. As illustrated, the user 100 is shown physically located in a real-world space 105 wearing an AR HMD 102 while interacting with AR scenes of the AR environment. As shown in the figure, various real-world objects 106a-106n are located on the surface of the coffee table 120. In one embodiment, the real-world objects 106a-106n may be included in the generated AR scenes since the real-world objects are located within the FOV 118 of the user 100. In particular, real-world object 106a is a "video game controller," real-world object 106b is a "mobile device," real-world objects 106c are "books," and real-world object 106n is a "knight chess piece." As further illustrated in FIG. 1B, the system is configured to detect that the hand of the user 100 is reaching toward the real-world object 106a (e.g., video game controller). Further, the gaze direction 116 of the user is directed toward the real-world object 106a (e.g., video game controller). Accordingly, in one embodiment, based on the physical actions of the user 100 (e.g., reaching toward video game controller and gaze direction directed at video game controller), the system may generate one or more AIEs 104a-104n and render the AEIs proximate to the real-world object 106a (e.g., video game controller) to highlight and emphasize the real-world object 106a. As a result, the AIEs 104a-104n may correspond to the real-world object 106a and may provide information that is contextual related to the real-world object 106a.

As illustrated in the example shown in FIG. 1B, the AIEs 104a-104n is rendered as virtual objects in the AR scene. In some embodiments, each AIE is configured to provide a dynamic interface that is selectable by a gesture of the user or by the hand of the user. For example, a gesture of the user may include pointing at the AIE, looking at the AIE, providing a voice command prompt, touching the AIE, etc. In one embodiment, the dynamic interface associated with the corresponding AIE 104 may provide information related to the real-world object and the information may be contextually related to the real-world object. In other embodiments, the dynamic interface associated with the corresponding AIE 104 may enable a way for the user to use the features that are associated with the real-world object such as performing specific functions and features associated with the real-world object. For example, referring to FIG. 1B, AIE 104a may provide information describing the real-world object 106a, e.g., PS4 video game controller. In another example, AIE 104b may automatically launch the user's favorite video game by turning on the computer 108 (e.g., game console) and displaying the video game on the display screen 110. In yet another example, AIE 104n may automatically launch and display the PlayStation Store on the display screen 110.

In some embodiments, the system in FIG. 1B may include an AR HMD 102 is wirelessly connected to a cloud computing and gaming system 114 over a network 112. As noted above, the cloud computing and gaming system 114 maintains and executes the AR scenes and video game being played by the user 100. The cloud computing and gaming system 114 is configured to process the inputs from the AR HMD 102 to affect the state of the AR scenes of the AR environment. The output from the executing AR scenes, such as virtual objects, real-world objects, video data, and audio data, is transmitted to the AR HMD 102 for rendering on the display of the AR HMD 102.

Figure 1C:
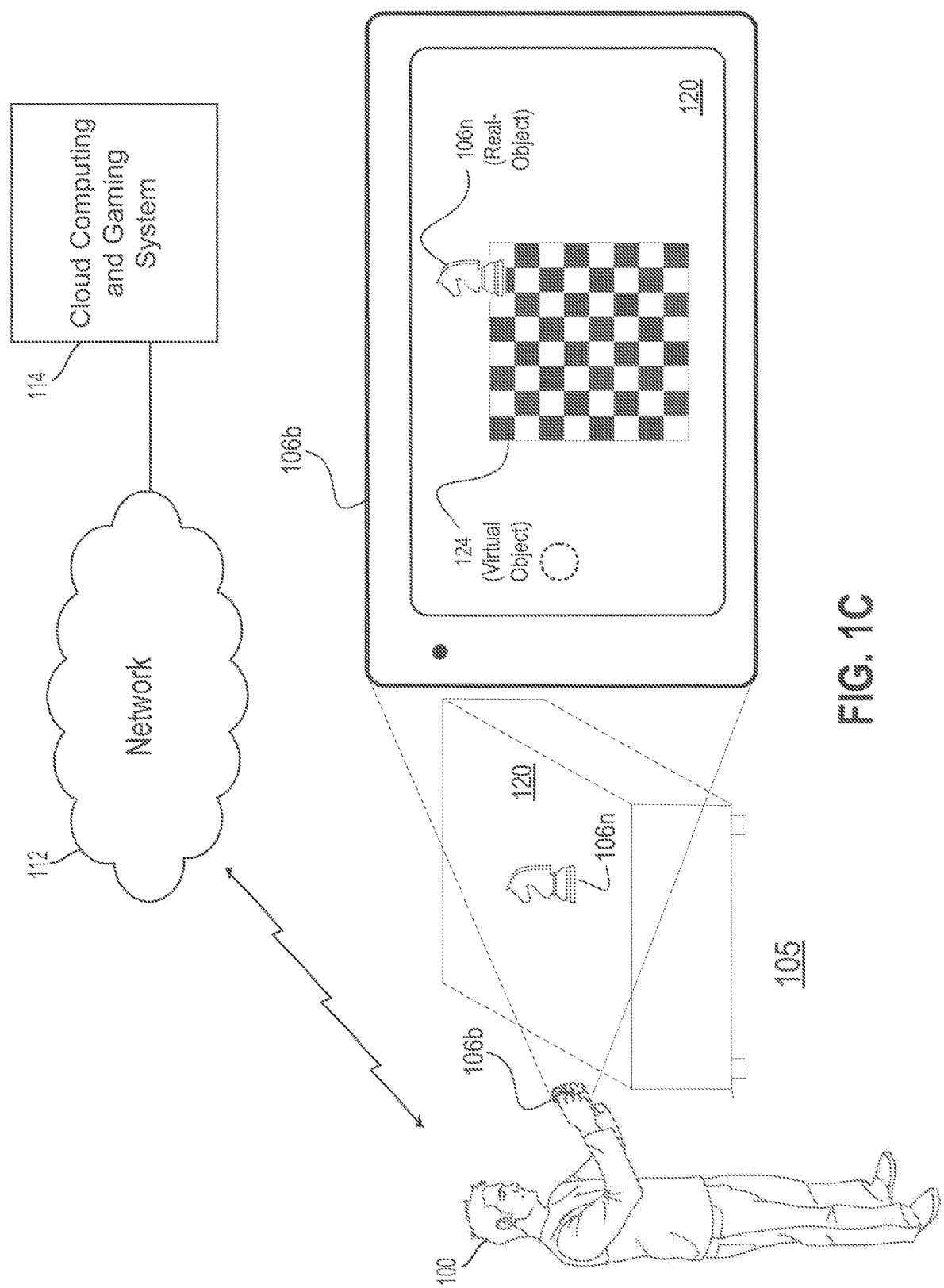
FIG. 1C illustrates an embodiment of a system for interaction with an AR environment via a mobile device, in accordance with an implementation of the disclosure.

FIG. 1C illustrates an embodiment of a system for interaction with an AR environment via a mobile device 106b. In some embodiments, non-HMDs may be substituted, including without limitation, portable device screens (e.g., tablet, smartphone, laptop, etc.) or any other type of display that can be configured to render video and/or provide for display of an interactive scene or virtual environment in accordance with the present implementations. For example, as illustrated in FIG. 1C a user 100 is shown physically located in a real-world space 105 using a mobile device 106b to view AR scenes. In the illustrated example, the display of the mobile device 106b illustrates AR scene which includes a real-world object 106b (e.g., knight chess piece) and a virtual object 124 (e.g., virtual chess board). In one embodiment, the virtual object 124 (e.g., virtual chess board) is generated in response to a selection of an AIE that enables the system to generate the virtual chess board. Accordingly, in one example, the real-world object 106b (e.g., knight chess piece), when provided with AIEs, enables use of the real-world object in the AR scene with the generated virtual chess board.

In some embodiments, as shown in FIG. 1C, the mobile device 106b is wirelessly connected to a cloud computing and gaming system 114 over a network 112. In one embodiment, the cloud computing and gaming system 114 maintains and executes the AR scenes and video game being played by the user 100. The cloud computing and gaming system 114 is configured to process the inputs from the mobile device 106b to affect the state of the AR scenes of the AR environment. The output from the executing AR scenes, such as virtual objects, real-world objects, video data, and audio data, is transmitted to the mobile device 106b for rendering on the display of the mobile device 106b.

Figure 2A:
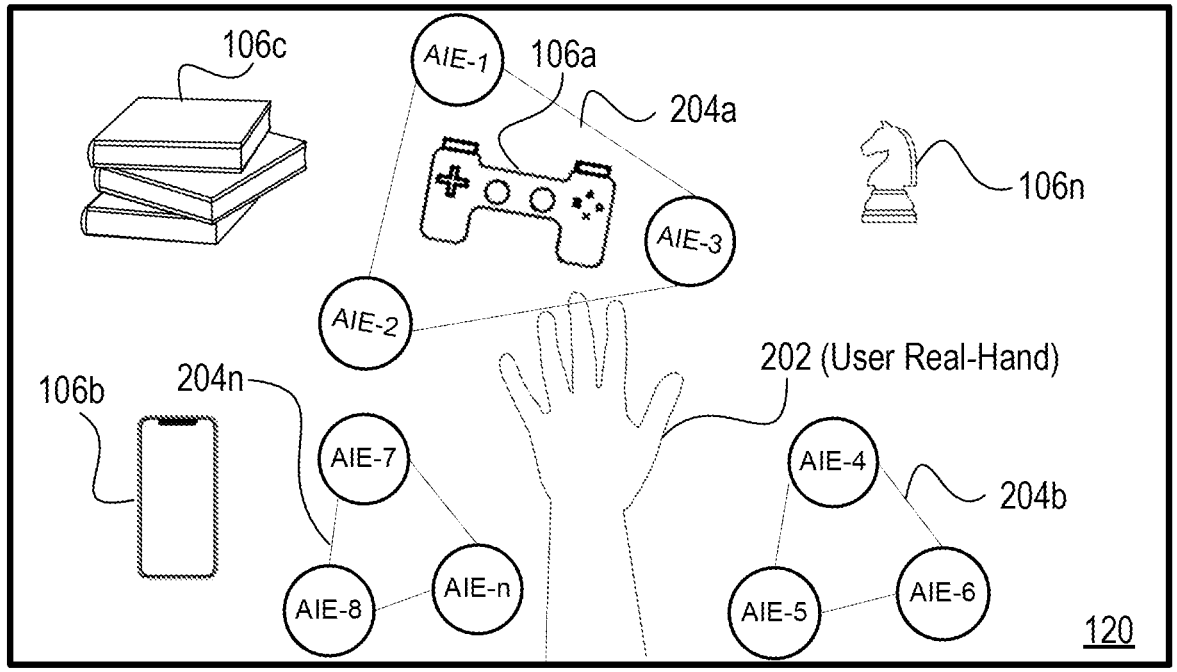
FIGS. 2A-2C illustrate various embodiments of different AR scenes that are viewed from a field of view (FOV) of a user 100 which include real-world objects and a plurality of AIEs 104 that are rendered at various positions within the respective AR scenes, in accordance with an implementation of the disclosure.
Figure 2B:
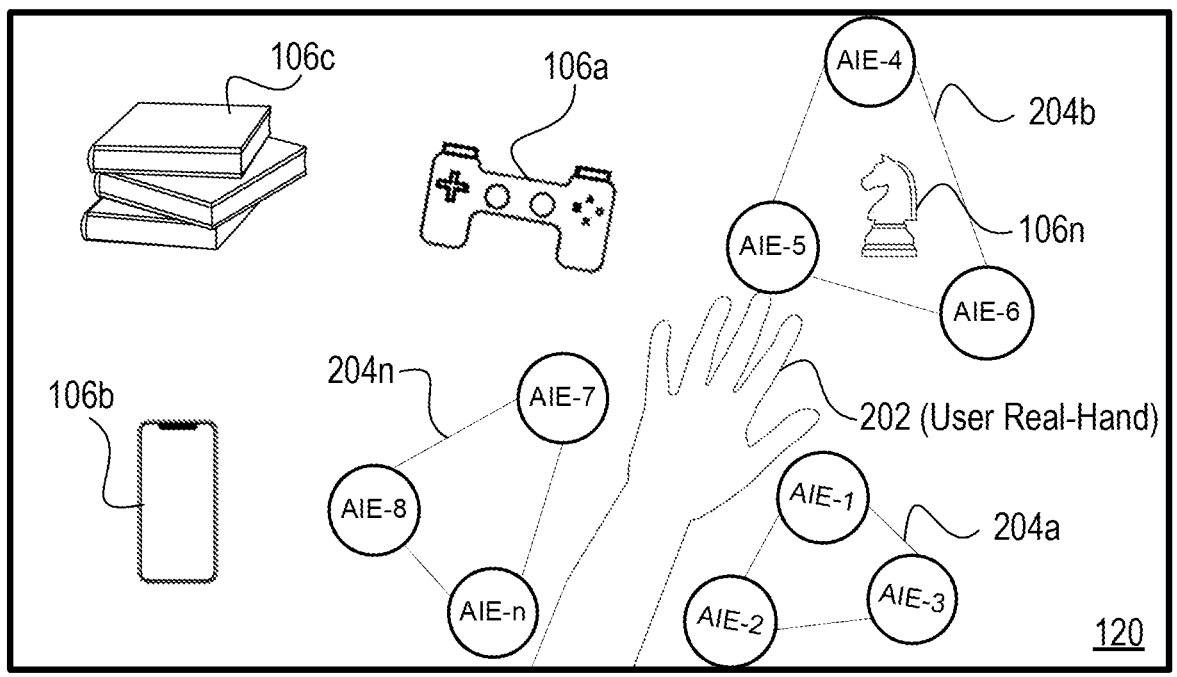
Figure 2C:
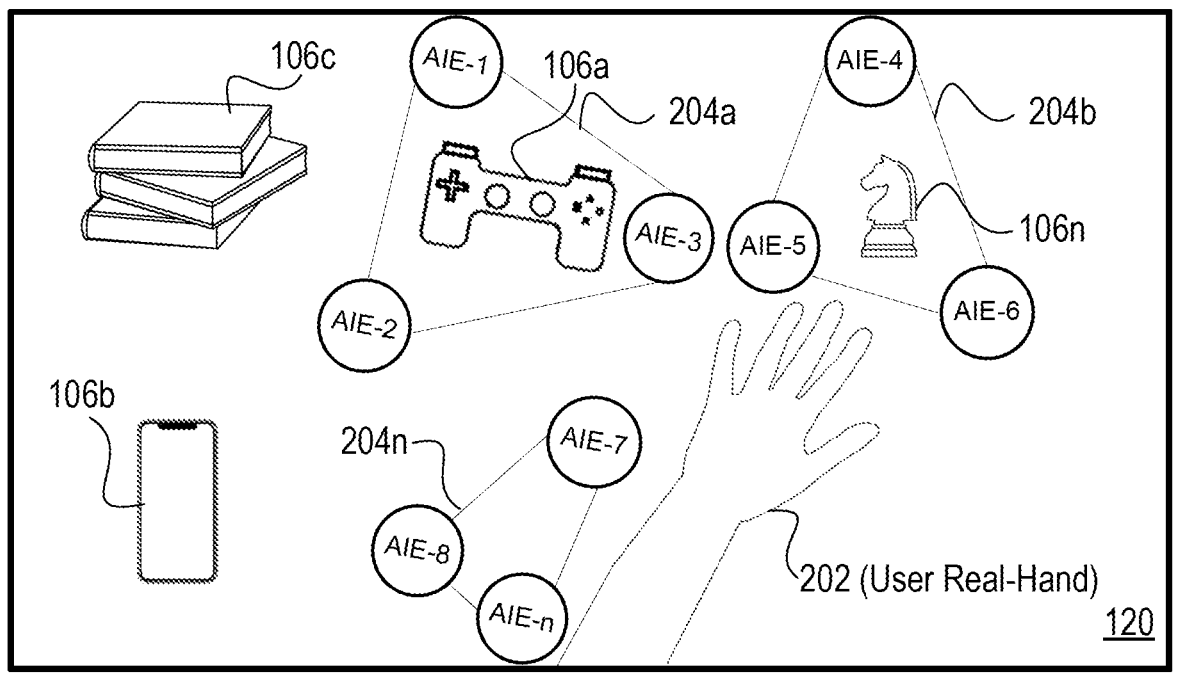

FIGS. 2A-2C illustrate various embodiments of different AR scenes that are viewed from a FOV of a user 100 which include real-world objects 106a-106n and a plurality of AIEs 104 (e.g., AIE-1 to AIE-n) that are rendered at various positions within the respective AR scenes. In the illustrated example shown in FIG. 2A, the AR scene illustrates various real-world objects 106a-106n on the surface of the coffee table 120 and the generated AIEs 104 (e.g., AIE-1 to AIE-n) at various locations within the AR scene. During the user's interaction with the AR scene, the externally facing camera located on the AR HMD 102 is configured to capture images of the real-world objects 106a-106n within the FOV of the user and to track the actions of the user 100. For example, as shown in FIG. 2A, the externally facing camera can be used to identify that real-world object 106a which corresponds to a "video game controller," real-world object 106b which corresponds to a "mobile device," real-world objects 106c which correspond to "books," and real-world object 106n which corresponds to a "knight chess piece." In some embodiments, the externally facing camera can detect that the hand of the user 100 is reaching into the AR scene in a direction toward real-world object 106a (e.g., video game controller).

In one embodiment, as the user interacts with the AR scene, a plurality of AIEs 104 can be generated along the hand 202 of the user 100 and proximate to the real-world object 106 that the hand of the user 100 is reaching toward. As shown in FIG. 2A, the AIEs 104 (e.g., AIE-1 to AIE-n) is rendered at different locations within the AR scene. In particular, a total of three AIEs 104 (e.g., AIE-1, AIE-2, AIE-3) that correspond real-world object 106a (e.g., video game controller) are rendered proximate to the video game controller since the hand 202 of the user 100 is reaching in a direction toward the real-world object 106a (e.g., video game controller). As illustrated, the three AIEs 104 (e.g., AIE-1, AIE-2, AIE-3) forms an AIE group 204a which is shaped in a triangular formation and surrounds the video game controller to highlight and emphasize the video game controller. In other embodiments, the AIE group 204a may form any other shape, e.g., circle, square, rectangle, oval, etc.

In one embodiment, when an AIE group 204 surrounds a real-world object 106, this may indicate that the corresponding AIEs are contextually related to the real-world object and the AIEs can provide information and enable selectable features that corresponds to the real-world object 106. For example, AIE-1 may provide information indicating that the real-world object 106a is a PS4 video game controller. AIE-2 may include a selectable feature associated with the PS4 video game controller that allows the user 100 to initiate an action associated with the video game controller such as automatically launching the user's favorite video game. AIE-3 may include a selectable feature that automatically launches and displays the PlayStation Store on the display screen of the user.

As further illustrated in the AR scene shown in FIG. 2A, AIE groups 204b-204n are rendered proximate to the hand and arm of the user 100. As shown, AIE group 204b forms a triangular shape which includes three AIEs 104 (e.g., AIE-4, AIE-5, AIE-6). Further, AIE group 204n forms a triangular shape which includes three AIEs 104 (e.g., AIE-7, AIE-8, AIE-n). In other embodiments, AIE groups 204b-204n may form any other shape, e.g., circle, square, rectangle, etc. As illustrated, neither AIE group 204b-204n surrounds a particular real-world object 106 since the AIE groups 204b-204n and its corresponding AIEs 106 are not relevant to the real-world object 106 that the hand 202 of the user is reaching toward, e.g., video game controller. Instead, the non-relevant AIEs are rendered proximate to the hand and arm of the user and the position of the non-relevant AIEs are updated to a position proximate the real-object when the hand 202 of the user reaches toward a real-object that relates to the non-relevant AIEs.

FIG. 2B illustrates an embodiment of AR scene illustrating the hand 202 of the user reaching toward another real-world object 106n (e.g., knight chess piece) in the AR scene. In some embodiments, the system is configured to detect an action by a hand 202 of the user 100 when reaching into the AR scene. As illustrated in the AR scene, the hand 202 of the user is directed toward a different real-world object 106n (e.g., knight chess piece) instead of the real-world object 106a (e.g., video game controller) shown in FIG. 2A. Since the hand 202 of the user is directed toward another real-world object in the AR scene, the system is configured to update the position of the AIEs such that the updated AIEs causes the AIEs to move from an initial position in the AR scene to an adjusted position in the AR scene.

For example, the system may determine that the hand 202 of the user 100 is directed toward the real-world object 106n (e.g., knight chess piece) and AIE group 204b its three AIEs 104 (e.g., AIE-4, AIE-5, AIE-6) are related to the real-world object 106n (e.g., knight chess piece). Accordingly, the system is configured to render the AIE group 204b at a position that is proximate to the real-world object 106n (e.g., knight chess piece) to highlight and emphasize the knight chess piece. In one example, AIE-4 may provide information indicating that the real-world object 106n is a knight chess piece and is used for playing chess. AIE-5 may include a selectable feature that sends a request to the system to automatically launch and display a virtual representation of a chess board. AIE-6 may include a selectable feature that sends a request to a friend of the user to join the user 100 to play a game of chess.

As further illustrated in FIG. 2B, AIE groups 204a and 204n are rendered proximate to the hand and arm of the user 100 since the corresponding AIEs are not relevant to the real-world object 106n (e.g., knight chess piece). For example, in one embodiment, AIE group 204a and its corresponding AIEs moved from a position proximate to the real-world object 106a (e.g., video game controller) to a position proximate to the hand and arm of the user since the hand 202 of the user 100 is no longer reaching in a direction toward the real-world object 106a (e.g., video game controller).

FIG. 2C illustrates another embodiment of AR scene illustrating the hand 202 of the user reaching toward the real-world object 106n (e.g., knight chess piece) and the position of AIE groups 204a-204n within the AR scene. Based on a prior AR interaction, with respect to FIG. 2A, the system previously determined that the AIE group 204a its corresponding AIEs (e.g., AIE-1, AIE-2, AIE-3) correspond to the real-world object 106a (e.g., video game controller). Accordingly, the AIE group 204a was rendered proximate to the video game controller since the hand 202 of the user 100 was reaching in a direction toward the real-world object 106a (e.g., video game controller). Referring to the embodiment shown in FIG. 2C, the hand 202 of the user 100 is shown reaching in a direction toward a different real-world object 106n (e.g., knight chess piece) where AIE group 204b is rendered proximate to the real-world object 106n (e.g., knight chess piece) to highlight and emphasize the knight chess piece. Accordingly, instead of moving the AIE group 204a and its corresponding AIEs to a different position within the AR scene, the AIE group 204a automatically stays at a position proximate to the real-world object 106a (e.g., video game controller) since the system has previously associated the AIE group 204a with the real-world object 106a (e.g., video game controller). As a result, over time, based on prior AR scene interactions, the system will be trained to learn which AIEs are related to the appropriate real-world objects in the AR scene so that the AIEs can be rendered at a position proximate to the real-world objects.

In some embodiments, the plurality of AIEs 104 can be selected and generated based on processing a profile of the user, physical actions of the user, and contextual data through model of the user. In one embodiment, the model is configured to identify features from the profile of the user, the physical actions of the user, and the contextual data to classify attributes of the user, the attributes of the user being used to select the AIEs. In one embodiment, the system may use the model to select and generate AIEs 104 that are predicted to be preferred by the user. For example, during the user's interaction with an AR environment, the system may determine that the user is reaching toward real-world object 106n (e.g., knight chess piece). Using the model, system may select and generate AIEs 104 that will allow the user to play chess on a virtual chess board since the user has played chess using a virtual chess board in prior interactions in the AR environment.

Figure 3:
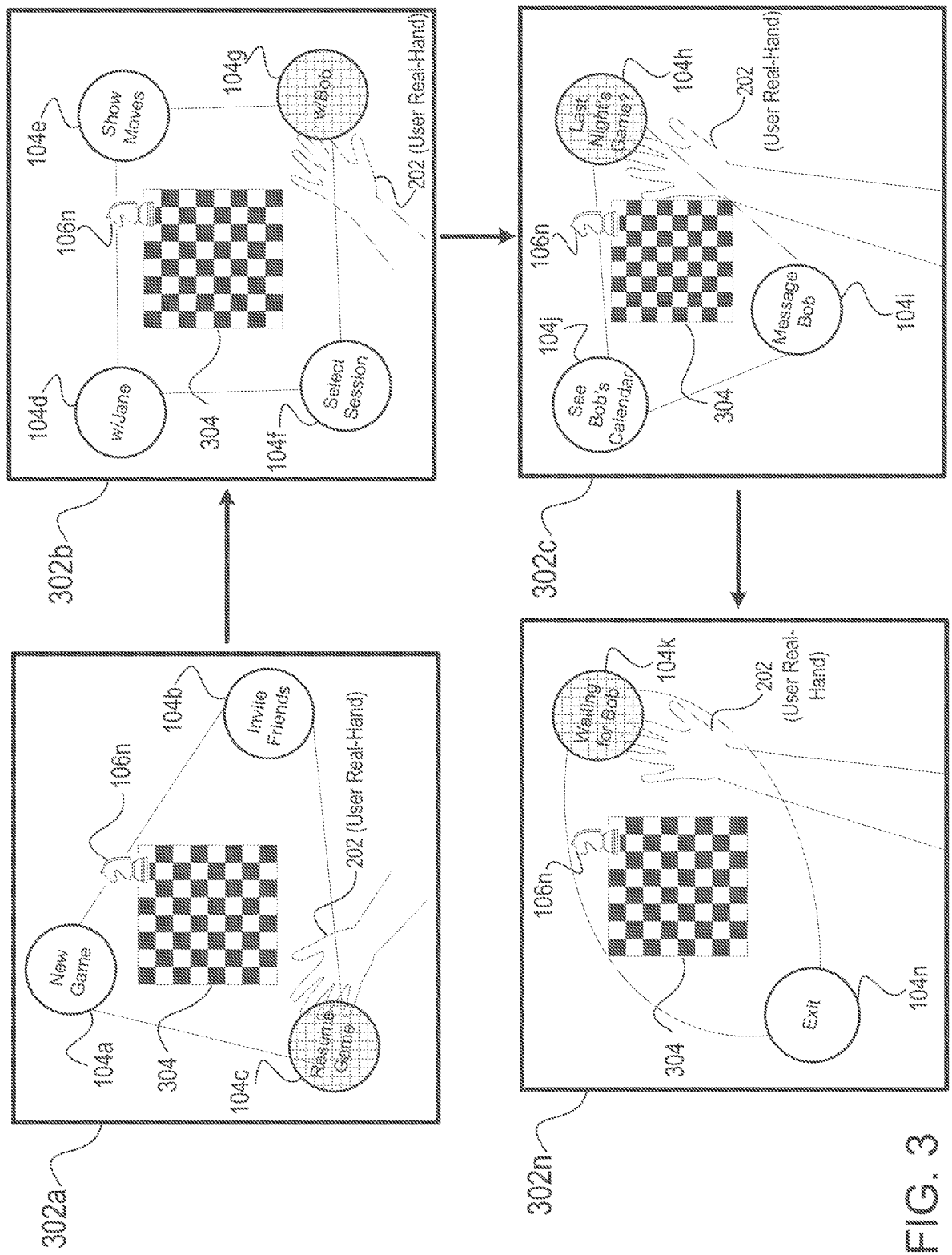
FIG. 3 illustrates an embodiment of a user interacting with various AIEs in an AR environment which includes the user initiating gameplay of a board game, in accordance with an implementation of the disclosure.

FIG. 3 illustrates an embodiment of a user 100 interacting with various AIEs 104a-104n in an AR environment which includes the user 100 initiating gameplay of a board game, e.g., chess. Referring to FIG. 2C, when the user 100 selects the dynamic interface associated with AIE-5, a request is sent to the system to automatically launch the virtual chess board 304 shown in FIG. 3. As illustrated in the embodiment of FIG. 3, the hand 202 of the user 100 is shown interacting and selecting various AIEs 104a-104n that are rendered within the AR scenes 302a-302n.

In one embodiment, as shown in AR scene 302a, the AR scene includes a total of three AIEs 104a-104c that are related to the real-world object 106n (e.g., knight chess piece) and the virtual chess board 304. In some embodiments, the AIEs 104a-104c may provide information related to the real-world object 106n (e.g., knight chess piece) or the virtual chess board 304. In other embodiments, the dynamic interface associated with the AIEs 104a-104c may initiate and perform specific functions and features associated with the knight chess piece or the virtual chess board 304. For example, as illustrated in the AR scene 302a, AIE 104a may allow the user 100 to initiate a "new game" where the user 100 can use the knight chess piece and generated virtual chess pieces to play chess on the virtual chess board 304. In another example, AIE 104b may automatically send a request to "invite friends" to join the user 100 in the gameplay. In another example, AIE 104c may automatically "resume game" of the user's previous gameplay. In the illustrated example, the user 100 is shown selecting AIE 104c (e.g., resume game) which initiates a previous chess game that the user 100 participated in.

As shown in AR scene 302b, the AR scene includes one or more updates to the AIEs after the user 100 selects the dynamic interface corresponding to AIE 104c. In one embodiment, when the gesture of the hand 202 of the user is determined to select the dynamic interface of an AIE, the selection of the AIE triggers an update to the AIEs rendered for providing additional AIEs for selection by additional one or more gestures. As illustrated in AR scene 302b, the additional AIEs 104e-104f forms a rectangular shape and surrounds the real-world object 106n (e.g., knight chess piece) and the virtual chess board 304. The AR scene includes a total of four updated AIEs 104e-104f that are related to the selected dynamic interface corresponding to AIE 104c (e.g., resume game), real-world object 106n (e.g., knight chess piece), and the virtual chess board 304. For example, as illustrated in the AR scene 302b, AIE 104d may allow the user 100 to resume the chess board game with a particular player, e.g., "with Jane." In another example, AIE 104e may show a listing of prior moves made by the user 100 in a particular game, e.g., "show moves." In another example, AIE 104f may allow the user 100 to select a particular prior game session to resume, e.g., "select session." In another example, AIE 104g may allow the user 100 to resume the chess board game with a particular player, e.g., "with Bob." In the illustrated example shown in AR scene 302b, the user 100 is shown selecting AIE 104g (e.g., with Bob) which initiates a previous chess game with Bob.

As shown in AR scene 302c, the AR scene includes one or more updates to the AIEs after the user 100 selects the dynamic interface corresponding to AIE 104g. As illustrated in the AR scene 302c, AIEs 104h-104j forms a triangular shape and surrounds the real-world object 106n (e.g., knight chess piece) and the virtual chess board 304. The AR scene includes a total of three updated AIEs 104e-104f which are related to the selected dynamic interface corresponding to AIE 104g (e.g., w/Bob), real-world object 106n (e.g., knight chess piece) and the virtual chess board 304. For example, as illustrated in AR scene 302c, AIE 104h may allow the user 100 to resume the chess board game with Bob from a particular game session, e.g., "Last Night's Game." In another example, AIE 104i may initiate sending a message to Bob, e.g., "Message Bob." In another example, AIE 104j may allow the user 100 to access Bob's calendar to see when Bob is available for a game session, e.g., "See Bob's Calendar." In the illustrated example shown in the AR scene 302c, the user 100 is shown selecting AIE 104h which initiates last night's game session with Bob.

As shown in AR scene 302n, the AR scene includes one or more updates to the AIEs after the user 100 selects the dynamic interface corresponding to AIE 104h. As illustrated in the AR scene 302n, the AIEs 104k-104n forms an oval shape and surrounds the real-world object 106n (e.g., knight chess piece) and the virtual chess board 304. The AR scene includes a total of two updated AIEs 104k-104n which are related to the selected dynamic interface corresponding to AIE 104h, the real-world object 106n (e.g., knight chess piece), and the virtual chess board 304. For example, as illustrated in the AR scene 302n, AIE 104k may send a request to the system indicating that the user is waiting for Bob to join the game session, e.g., "Waiting for Bob." In another example, AIE 104n may allow the user to exit out of the AR scene, e.g., "Exit." In the illustrated example shown in the AR scene 302n, the user 100 is shown selecting AIE 104k to notify the system that the user 100 is waiting for Bob to join the game session.

Figure 4:
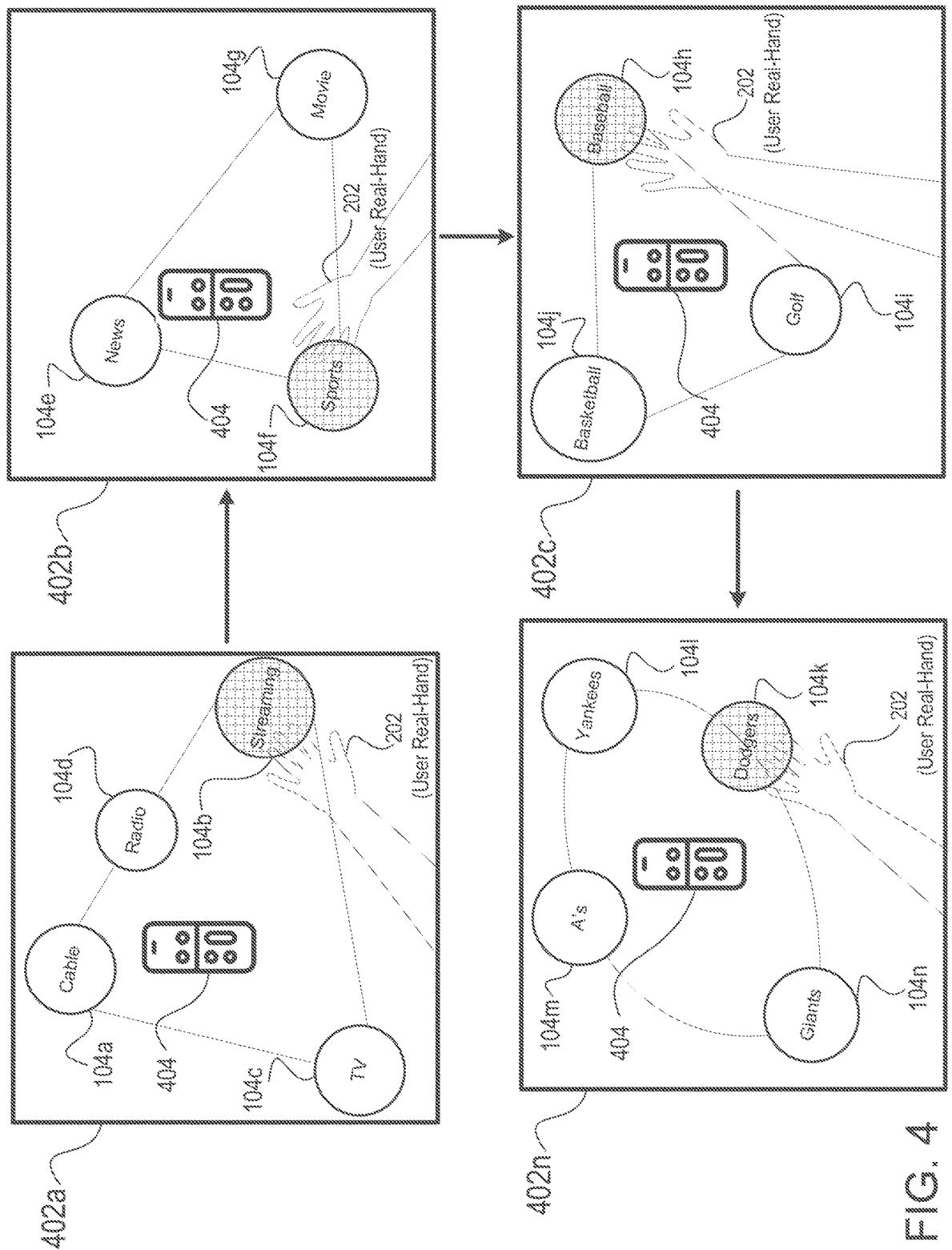
FIG. 4 illustrates an embodiment of a user interacting with various that are rendered proximate to a universal controller in an AR environment, in accordance with an implementation of the disclosure.

FIG. 4 illustrates an embodiment of a user 100 interacting with various AIEs 104a-104n that are rendered proximate to a universal controller 404 in an AR environment. As illustrated, the hand 202 of the user 100 is shown interacting and selecting various AIEs 104a-104n that are rendered within the AR scenes 402a-402n. In one embodiment, as shown in AR scene 402a, the AR scene includes a total of four AIEs 104a-104d that are related to the universal controller 404. In some embodiments, the universal controller 404 may be a real-world object or a virtual object. The AIEs 104a-104n may provide information related to the universal controller 404. In other embodiments, the AIEs 104a-104n may initiate and perform specific functions and features associated with the universal controller 404.

For example, as illustrated in the AR scene 402a, selecting AIE 104a may turn on a cable box so that the user can watch cable television, e.g., "Cable." In another example, selecting AIE 104b may automatically turn on a streaming device so that the user can view content via the streaming device, e.g., "Streaming." In another example, selecting AIE 104c may automatically turn on a television of the user, e.g., "TV." In another example, selecting AIE 104d may automatically turn on a radio of the user, e.g., "Radio." In the illustrated example, the user 100 is shown selecting AIE 104b which initiates the streaming device of the user so that the user can select specific content to view.

As shown in AR scene 402b, the AR scene includes one or more updates to the AIEs after the user 100 selects the dynamic interface corresponding to AIE 104b. As illustrated in the AR scene 402b, the AIEs 104e-104g forms a rectangular shape which surrounds the universal controller 404. The AR scene includes a total of three updated AIEs 104e-104g which are related to the selected dynamic interface and the universal controller 404. For example, as illustrated in the AR scene 402b, selecting AIE 104e may allow the user 100 to access news content from the streaming device, e.g., "news." In another example, selecting AIE 104f may allow the user 100 to access sports content from the streaming device, e.g., "sports." In another example, selecting AIE 104g may allow the user 100 to access movie content from the streaming device, e.g., "movie." In the illustrated example shown in the AR scene 402b, the user 100 is shown selecting AIE 104f (e.g., Sports) which allows access to a library of sports channels that are available through the streaming device.

As shown in AR scene 402c, the AR scene includes one or more updates to the AIEs after the user 100 selects the dynamic interface corresponding to AIE 104f (e.g., Sports). As illustrated in the AR scene 402c, the AIEs 104h-104j forms a triangular shape which surrounds the universal controller 404. The AR scene includes a total of three updated AIEs 104h-104j which are related to the selected dynamic interface and the universal controller 404. For example, as illustrated in the AR scene 402c, selecting AIE 104h may provide the user 100 with access to baseball related content from streaming device, e.g., "baseball." In another example, selecting AIE 104i may allow the user 100 to access golf related content from the streaming device, e.g., "golf." In another example, selecting AIE 104j may allow the user 100 to access basketball related content from the streaming device, e.g., "basketball." In the illustrated example shown in the AR scene 402c, the user 100 is shown selecting AIE 104h (e.g., Baseball) which provides access to a library of baseball related content that is available through the streaming device.

As shown in AR scene 402n, the AR scene includes one or more updates to the AIEs after the user 100 selects the dynamic interface corresponding to AIE 104h (e.g., Baseball). As illustrated in the AR scene 402n, the AIEs 104k-104n forms an oval shape which surrounds the universal controller 404. The AR scene includes a total of four updated AIEs 104k-104n which are related to the selected dynamic interface and the universal controller 404. For example, as illustrated in the AR scene 402n, AIE 104k may allow the user 100 to access baseball content related to the Dodgers baseball team, e.g., Dodgers. In another example, AIE 104l may allow the user 100 to access baseball content related to the Yankees baseball team, e.g., Yankees. In another example, AIE 104m may allow the user 100 to access baseball content related to the A's baseball team, e.g., A's. In another example, AIE 104n may allow the user 100 to access baseball content related to the Giants baseball team, e.g., Giants. In the illustrated example shown in the AR scene 402n, the user 100 is shown selecting AIE 104k (e.g., Dodgers) which provides access baseball content related to the Dodgers.

Figure 5:
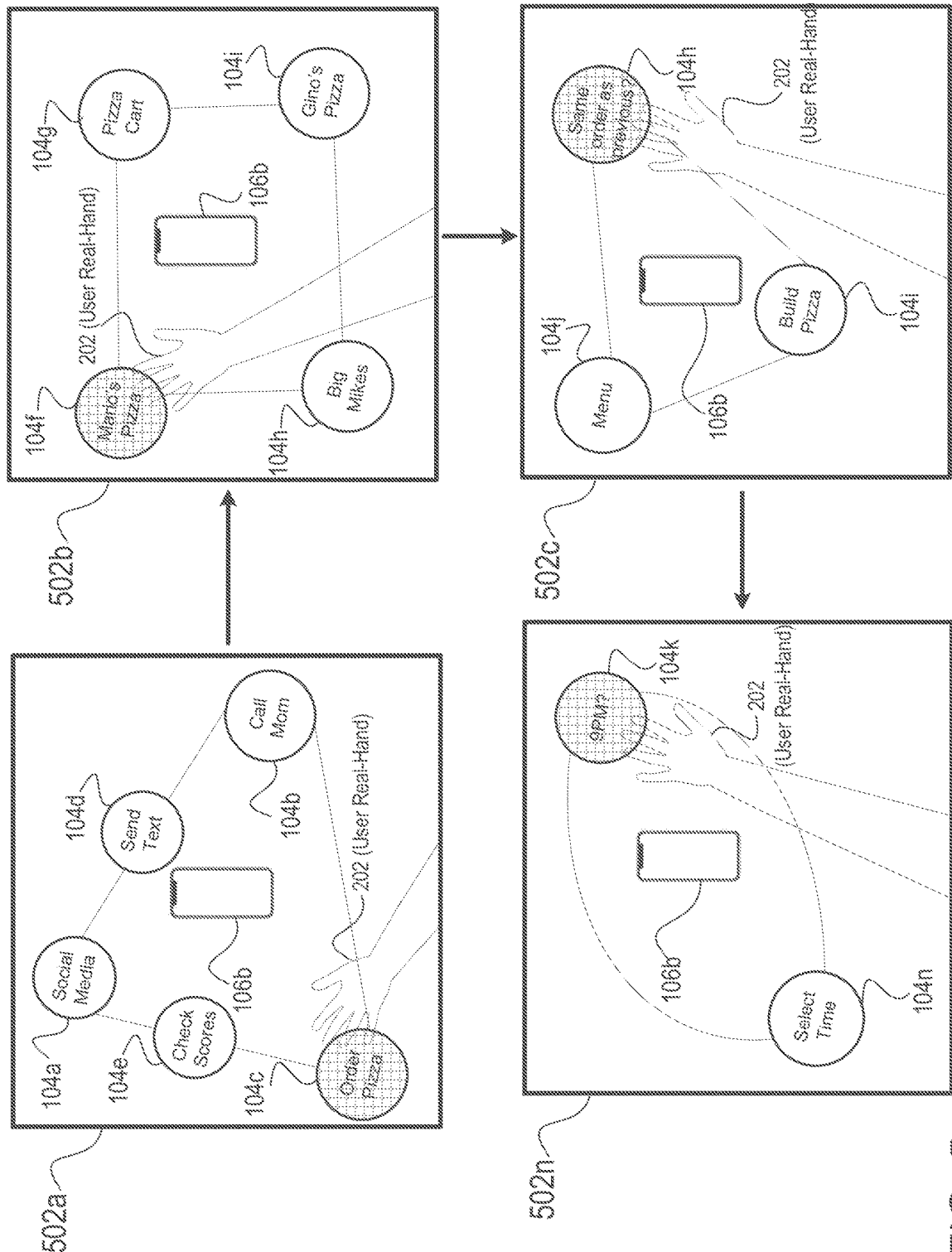
FIG. 5 illustrates an embodiment of a user interacting with various that are rendered proximate to a mobile device in an AR environment, in accordance with an implementation of the disclosure.

FIG. 5 illustrates an embodiment of a user 100 interacting with various AIEs 104a-104n that are rendered proximate to a mobile device 106b in an AR environment. As illustrated, the hand 202 of the user 100 is shown selecting various AIEs 104a-104n that are rendered within the AR scenes 502a-502n. In one embodiment, as shown in AR scene 502a, the AR scene includes a total of five AIEs 104a-104e that are related to the selected dynamic interface and the mobile device 106b. In some embodiments, the mobile device 106b may be a real-world object or a virtual object. The AIEs may provide information related to the mobile device 106b. In other embodiments, the AIEs may enable the user to initiate and perform specific functions and features associated with the mobile device 106b.

For example, as illustrated in the AR scene 502a, selecting AIE 104a may provide the user with access to various social media platforms, e.g., "Social Media." In another example, selecting AIE 104b may automatically initiate a call to the user's mom, e.g., "Call Mom." In another example, selecting AIE 104c may automatically initiate an order for pizza, e.g., "Order Pizza." In another example, selecting AIE 104d may automatically initiate a text message using the mobile device 106b, e.g., "Send Text." In the illustrated example, the user 100 is shown selecting AIE 104c which initiates an order for pizza using the mobile device 106b.

As shown in AR scene 502b, the AR scene includes one or more updates to the AIEs after the user 100 selects the dynamic interface corresponding to AIE 104c (e.g., Order Pizza). As illustrated in the AR scene 502b, the AIEs 104f-104i forms a rectangular shape which surrounds the mobile device 106b. The AR scene includes a total of four updated AIEs 104e-104g which are related to the selected dynamic interface and the mobile device 106b. For example, as illustrated in the AR scene 502b, selecting AIE 104f may initiate an order for pizza at Mario's Pizza. In another example, selecting AIE 104g may initiate an order for pizza at Pizza Cart. In another example, selecting AIE 104h may initiate an order for pizza at Big Mikes. In another example, selecting AIE 104i may initiate an order for pizza at Gino's Pizza. In the illustrated example shown in AR scene 502b, the user 100 is shown selecting AIE 104f (e.g., Mario's Pizza) which initiates an order for pizza at Mario's Pizza.

As shown in AR scene 502c, the AR scene includes one or more updates to the AIEs after the user 100 selects the dynamic interface corresponding to AIE 104f (e.g., Mario's Pizza). As shown, the AIEs 104h-104j forms a triangular shape which surrounds the mobile device 106b. The AR scene includes a total of three updated AIEs 104h-104j which are related to the selected dynamic interface and the mobile device 106b. For example, as illustrated in the AR scene 502c, selecting AIE 104h may allow the user to place the same order as a previous order made by the user, e.g., Same Order as Previous. In another example, selecting AIE 104i may allow the user 100 to build a new pizza from scratch, e.g., Build Pizza. In another example, selecting AIE 104j may allow the user 100 to view the menu at Mario's Pizza, e.g., Menu. In the illustrated example shown in the AR scene 502c, the user 100 is shown selecting AIE 104h which automatically places an order for the same pizza that the user had previously order.

As shown in AR scene 502n, the AR scene includes one or more updates to the AIEs after the user 100 selects the dynamic interface corresponding to AIE 104h (e.g., Same Order as Previous). As illustrated in the AR scene 502n, the AIEs 104k-104n forms an oval shape which surrounds the mobile device 106b. The AR scene includes a total of two updated AIEs 104k-104n which are related to ordering pizza via the mobile device 106b. For example, as illustrated in the AR scene 502n, AIE 104k may request the pizza to be delivered at 9 PM.

Figure 6:
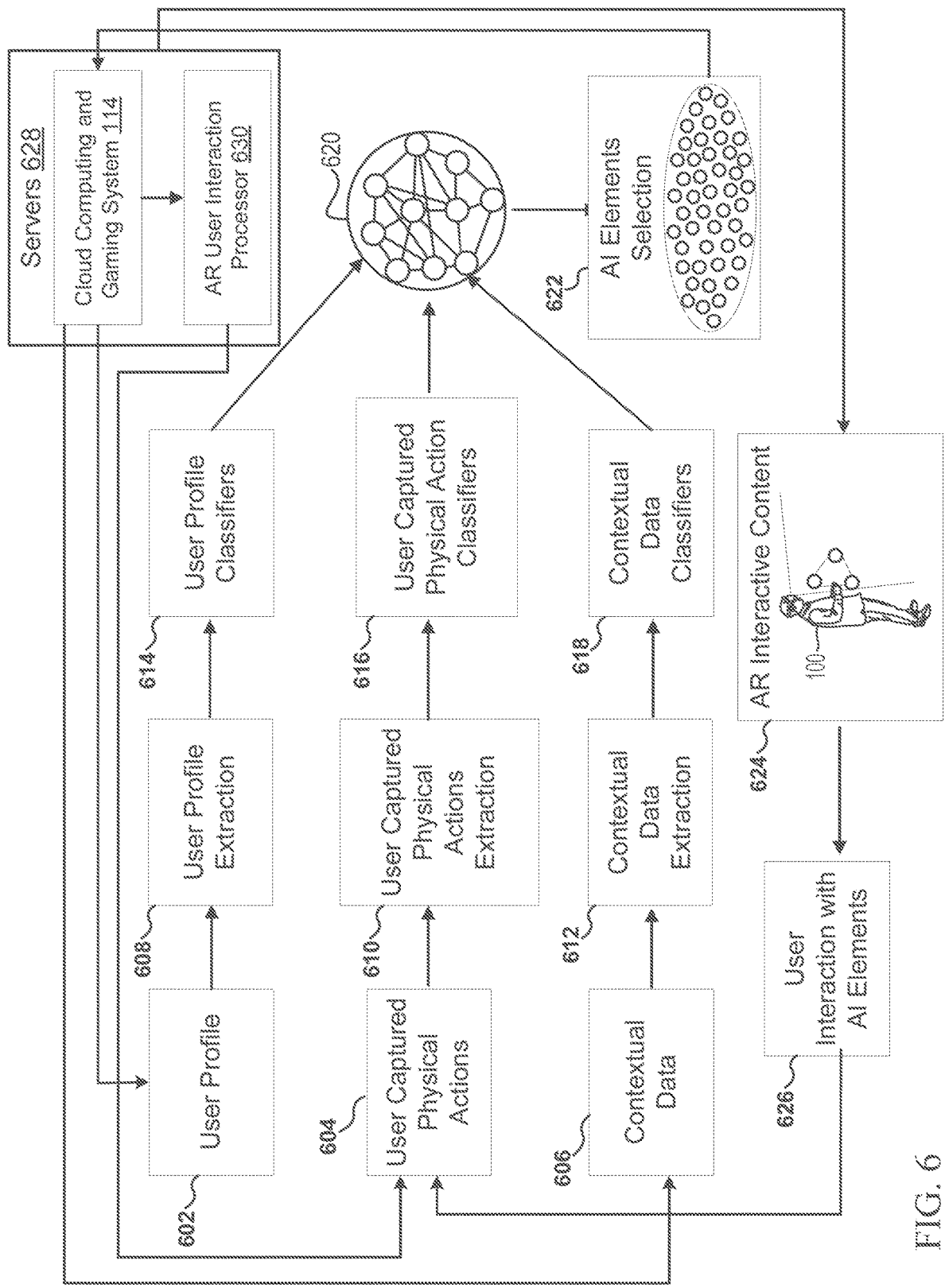
FIG. 6 illustrates an embodiment of a method for using a model to dynamically select one or more AIEs for rendering in an AR scene using a user profile, user captured physical actions, and contextual data as inputs, in accordance with an implementation of the disclosure.

FIG. 6 illustrates an embodiment of a method for using a model 620 to dynamically select one or more AIEs 104 for rendering in an AR scene using a user profile 602, user captured physical actions 604, and contextual data 606 as inputs. As noted above, each AIE 104 is placed in a position that is proximate to the hand of the user and proximate to the real-world objects. In this way, this facilitates an enhanced and improved AR experience for the user since the AIEs may provide information related to the real-world object. In turn, this can enhance the AR experience for users who may want a seamless way to quickly access information related to a real-world object.

As shown in FIG. 6, in one embodiment, the system may include feature extraction operations (e.g., 608, 610, 612) that are configured to identify various features in the user profile 602, the user captured physical actions 604, and the contextual data 606. After the feature extraction operations identifies the features associated with the inputs, classifier operations (e.g., 614, 616, 618) may be configured to classify the features using one or more classifiers. In some embodiments, the system includes a model 620 of the user that is configured to receive the classified features from the classifier operations. Using the classified features, the model 620 can be used to select AIEs 104 for rendering in an AR scene and to determine which real-world objects each one of the selected AIEs correspond to. In some embodiments, operation 622 can use the model 620 to determine which AIEs 104 to select for rendering, the corresponding real-world objects for each AIE, and the location to render the AIEs within the AR scene.

In another embodiment, a cloud computing and gaming system 114 located at server 628 may receive the selected AIEs 104 from operation 622 for processing. In some embodiments, the cloud computing and gaming system 114 may work together with an AR user interaction processor 630 to process the selected AIEs 104 to generate AR interactive content to the user 100. In one embodiment, at operation 624, the user is configured to receive the AR interactive content which can be rendered on a display of a device of the user. In another embodiment, operation 626 can be configured to capture the user's interaction with the AIEs which can be incorporated into the user captured physical actions 604 as feedback data.

In one embodiment, the system can process the user profile 602. The user profile 602 may include various attributes and information associated with user 100 such as gameplay tendencies, behavior tendencies, viewing history, preferences, interests, disinterests, etc. In some embodiments, the user profile extraction 608 operation is configured to process the user profile 602 to identify and extract features associated with the profile of the user 100. After the user profile extraction 608 operation processes and identifies the features from the user profile 602, the user profile classifiers 614 operation is configured to classify the features using one or more classifiers. In one embodiment, the features are labeled using a classification algorithm for further refining by the model 620.

In another embodiment, the system can process the user captured physical actions 604. In some embodiments, the physical actions of the user are continuously monitored and tracked during the user's interaction with the AR environment. In one embodiment, the user captured physical actions 604 may include various attributes and information associated with the actions of the user such as hand movement data, head movement data, body movement data, eye gaze data, voice capture data, face capture data, and controller input data. For example, a user 100 may be viewing AR interactive content that includes a living room (e.g., real-world space) with various real-world objects located in the living room, e.g., remote control, TV, stereo system. The hand movement data and the eye gaze data of the user may provide information that the user is reaching toward the remote control and looking at the stereo system. Accordingly, the system may infer that the user is interested in turning on the stereo system and select AIEs that correspond to the stereo system for rendering in the AR scene.

In some embodiments, the user captured physical actions extraction 610 operation is configured to process the user captured physical actions 604 to identify and extract features associated with the physical actions of the user. After the user captured physical actions extraction 610 operation processes and identifies the features from the user captured physical actions 604, the user captured physical actions classifier 616 operation is configured to classify the features using one or more classifiers. In one embodiment, the features are labeled using a classification algorithm for further refining by the model 620.

In another embodiment, the system can process the contextual data 606. In one embodiment, the contextual data 606 may include a variety of information associated with the context of the AR environment that the user is interacting in such as real-world space, real-world objects, virtual objects, date, time, contextual data regarding the interaction, etc. For example, the contextual data 606 may provide information that indicates that it is a Friday evening and that the user generally eats dinner at 7 PM. In other embodiments, the contextual data extraction 612 operation is configured to process the contextual data 606 to identify and extract features associated with the context of the user. After the contextual data extraction 612 processes and identifies the features from the contextual data 606, the contextual data classifiers 618 operation is configured to classify the features using one or more classifiers. In some embodiments, the features are labeled using a classification algorithm for further refining by the model 620.

In some embodiments, the model 620 is configured to receive as inputs the classified features (e.g., user profile classified features, user captured physical actions classified features, contextual data classified features). In another embodiment, other inputs that are not direct inputs or lack of input/feedback, may also be taken as inputs to the model 620. The model 620 may use a machine learning model to predict one or more AIEs 104 to select and its corresponding real-world objects that it corresponds to. In other embodiments, the model 620 can receive as input feedback data such as data related to the selected AIEs by the user in prior interactions with an AR interactive content. The feedback data, in one example, may include selections and non-selections of AIEs by the user.

In one example, a user profile 602 associated with a user may indicate that the user has the tendency to order pizza from Mario's Pizzeria every other Friday evening for dinner. Further, while interacting in the AR interactive content, based on the user captured physical actions 604 associated with the user, the system may determine that the user is reaching toward a mobile device (e.g., real-world object). The contextual data 606 may further indicate that it is a Friday evening and that the user and his friends are trying to decide what to have for dinner. Accordingly, using the user profile, user captured physical actions, and the contextual data, the model 620 may be used to select AIEs 104 that are related to the mobile device where one or more of the AIEs 104 would include selectable features that would enable the user to order pizza from Mario's Pizzeria.

In some embodiments, operation 622 can use the model 620 to determine which AIEs 104 to select for rendering, the corresponding real-world objects associated with the AIEs, and the location to render the AIEs within the AR scene. Once the AIEs 104 are selected for rendering as virtual objects in the AR scene, the AIEs are received by server 628 for processing. In some embodiments, server 628 may include the cloud computing and gaming system 114 and the AR user interaction processor 630. In one embodiment, the cloud computing and gaming system 114 may receive the selected AIEs 104 from operation 622 for processing. In one embodiment, the cloud computing and gaming system 114 is configured to generate the AR interactive content and context of the environment which may include various AR scenes. In one embodiment, the AR scenes are continuously updated based on the interaction of the user. In other embodiments, the user profile 602 and the contextual data 606 can be provided by the cloud computing and gaming system 114.

In some embodiments, the cloud computing and gaming system 114 may work together with an AR user interaction processor 630 to render the AIEs 104 at its respective location and position within the AR scene. For example, the AR user interaction processor 630 may determine the direction of the user's eye gaze is directed toward a chess piece (e.g., real-world object) and that the user's hand is reaching in a direction toward the chess piece. Accordingly, the cloud computing and gaming system 114 may infer that the user is interested in playing chess and generate AR interactive content (e.g., AR scenes with real-objects and virtual objects) that include AIEs that are rendered proximate to the chess piece for selection by the user. In other embodiments, the user captured physical actions 604 can be provided by the AR user interaction processor 630.

After the cloud computing and gaming system 114 the AR user interaction processor 630 produces the AR interactive content, operation 624 is configured to receive the AR interactive content so that the user 100 can interact with the AR interactive content. In one embodiment, the AR interactive content may include composite images of the real-world with AIEs in position in context of what the user is doing or playing (e.g., AIEs in position near a chess piece). In one example, as the hand of the user moves and changes direction within the AR scene, the AIEs 104 follows and stays at a position that is proximate to the hand of the user. In other embodiments, while the user interacts with the AR interactive content and selects the AIEs, operation 624 can continuously receive updates to the AR interactive content which may include updated AIEs that are rendered at their appropriate locations. In one embodiment, the updated AIEs may provide information related to the real-world objects in the AR scene and provide additional AIEs for selection by the user.

In one embodiment, during the user's interaction with the AR interactive content, operation 626 is configured to capture the user's interaction with the AIEs, the real-world objects, and any other virtual objects in the AR interactive content. In some embodiments, operation 626 can be configured to assess the user's interaction with the AIEs, and the placement of the AIEs in the AR scene. The user's interaction with the AIEs may be explicit or implied by the user. For example, if AIEs are rendered near a real-world object and is ignored by the user, it may be implied that the user is not interested in the real-world object. Accordingly, various inferences can be captured by operation 626 and incorporated into the user captured physical actions 604 or user profile 602 which can help provide a more accurate selection of the AIEs.

FIG. 7 illustrates an embodiment of a user captured physical actions table 702 illustrating various physical actions that are captured while the user is interacting with the AR interactive content. As shown, the user captured physical actions table 702 includes a physical action category 704 and a general description 706. In one embodiment, the physical action category 704 may include information associated with the user that is captured during the user's interaction with the AR environment such as body movement data, eye gaze data, voice capture data, face capture data, controller input data, etc.

To provide an illustration of the user captured physical actions table 702 in FIG. 7, in one example, the system may determine that based on the contextual data, the user is using an AR HMD to play a video game in a living room of the user. Using the user captured physical actions table 702, eye gaze data and the face capture data indicates that user is looking at a remote control that is sitting on a coffee table of the user. Based on the user profile data and the contextual data, the system may determine that a live baseball game that includes the user's favorite team will be starting in the next five minutes. Accordingly, the system may select one or more AIEs for rendering proximate to the remote control where the one or more AIEs correspond to features that will enable the remote control to automatically turn on a TV to display the baseball game. Accordingly, the selected AIEs can be selected and rendered at a position proximate to the user based on the physical actions of the user, profile of the user, and contextual information so that the user can seamlessly select features associated with the remote control (e.g., turn on TV and stream baseball game) in an efficient manner.

Figure 8:
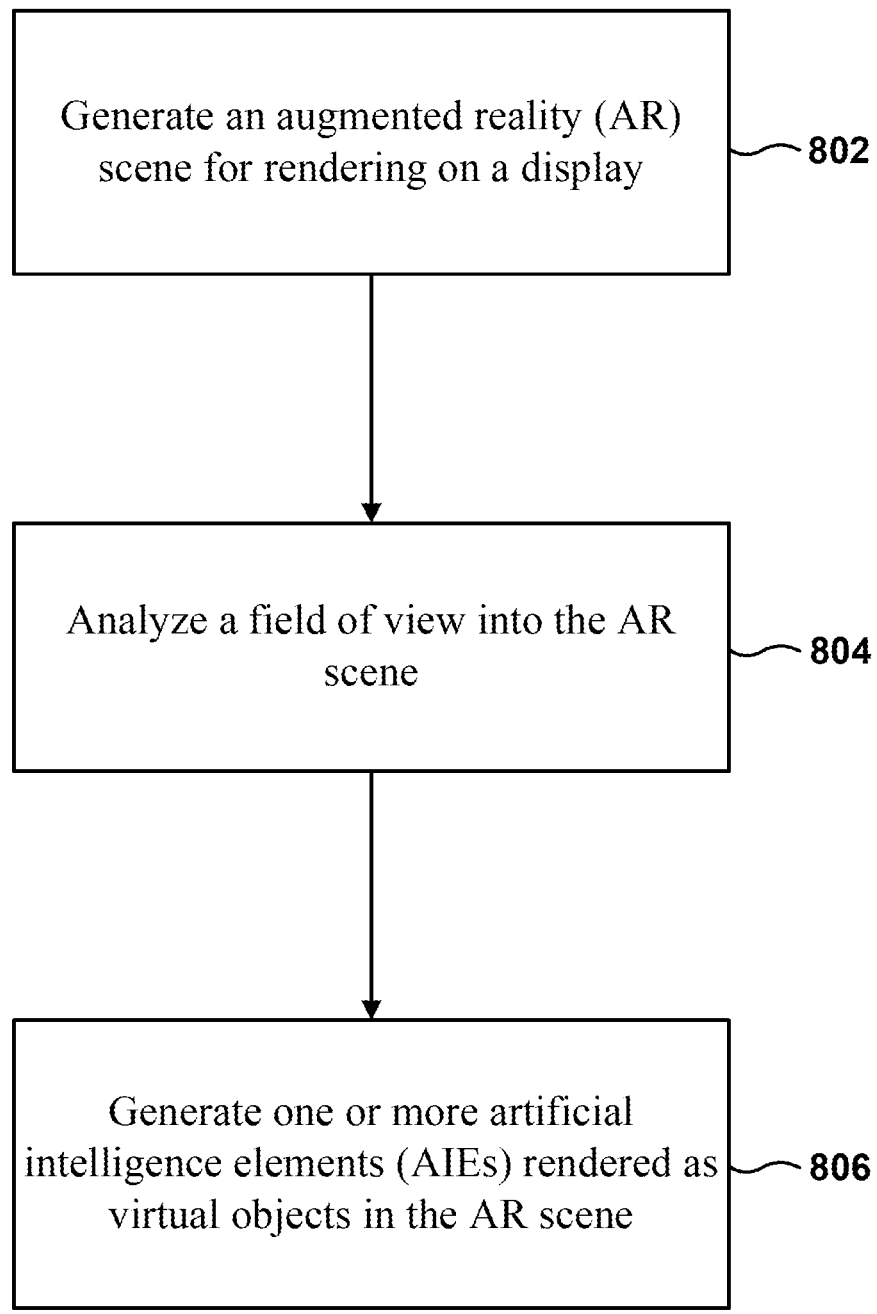
FIG. 8 illustrates a method for generating an AR scene for a user and generating one or more AIEs for rendering in the AR scene, in accordance with an implementation of the disclosure.

FIG. 8 illustrates a method for generating an AR scene for a user and generating one or more artificial AIEs for rendering in the AR scene. In one embodiment, the method described in FIG. 8 provides the user with an enhanced and improved AR experience since the AIEs may provide information related to the real-world objects in the AR scene which can be quickly accessible by the user. In one embodiment, the method includes an operation 802 that is configured to generate an augmented reality AR scene for rendering on a display. In some embodiments, the AR scene may include a real-world space and virtual objects projected in the real-world space. For example, a user may be wearing AR goggles that includes a display. While immersed in the AR environment that includes both real-world objects and virtual objects, the user can interact with the various virtual objects and the real-world objects that that are displayed to the user.

The method shown in FIG. 8 then flows to operation 804 where the operation is configured to analyze a FOV into the AR scene. In one embodiment, operation 804 is configured to detect an action by a hand of the user when reaching into the AR scene. In some embodiments, operation 804 is configured to use an externally facing camera to capture images that are within the FOV of the user, e.g., real-world objects and virtual objects. In one embodiment, the externally facing camera can be used to detect the various actions of the user such as the hand movements and hand gestures of the user when reaching into the AR scene. In other embodiments, operation 804 is configured to capture other actions of the user such as body movement data, eye gaze data, voice capture data, face capture data, and controller input data.

The method flows to operation 806 where the operation is configured to generate one or more AIEs that are rendered as virtual objects in the AR scene. In one embodiment, each AIE is configured to provide a dynamic interface that is selectable by a gesture of the hand of the user. In some embodiments, operation 806 may use a model to select the AIEs for generating in the AR scene. In one example, the plurality of AIEs can be selected and generated based on processing a profile of the user, physical actions of the user, and contextual data through model of the user. In one embodiment, the selected AIEs are selected based on the interests and preferences of the user. In other embodiments, the selected AIEs are related to the real-objects in the AR scene. In other embodiments, operation 806 is configured to render the AIEs proximate to the real-world object present in the real-world space. In some embodiments, the real-world object is located in a direction of where the hand of the user is detected to be reaching when the user makes the action by the hand.

Figure 9:
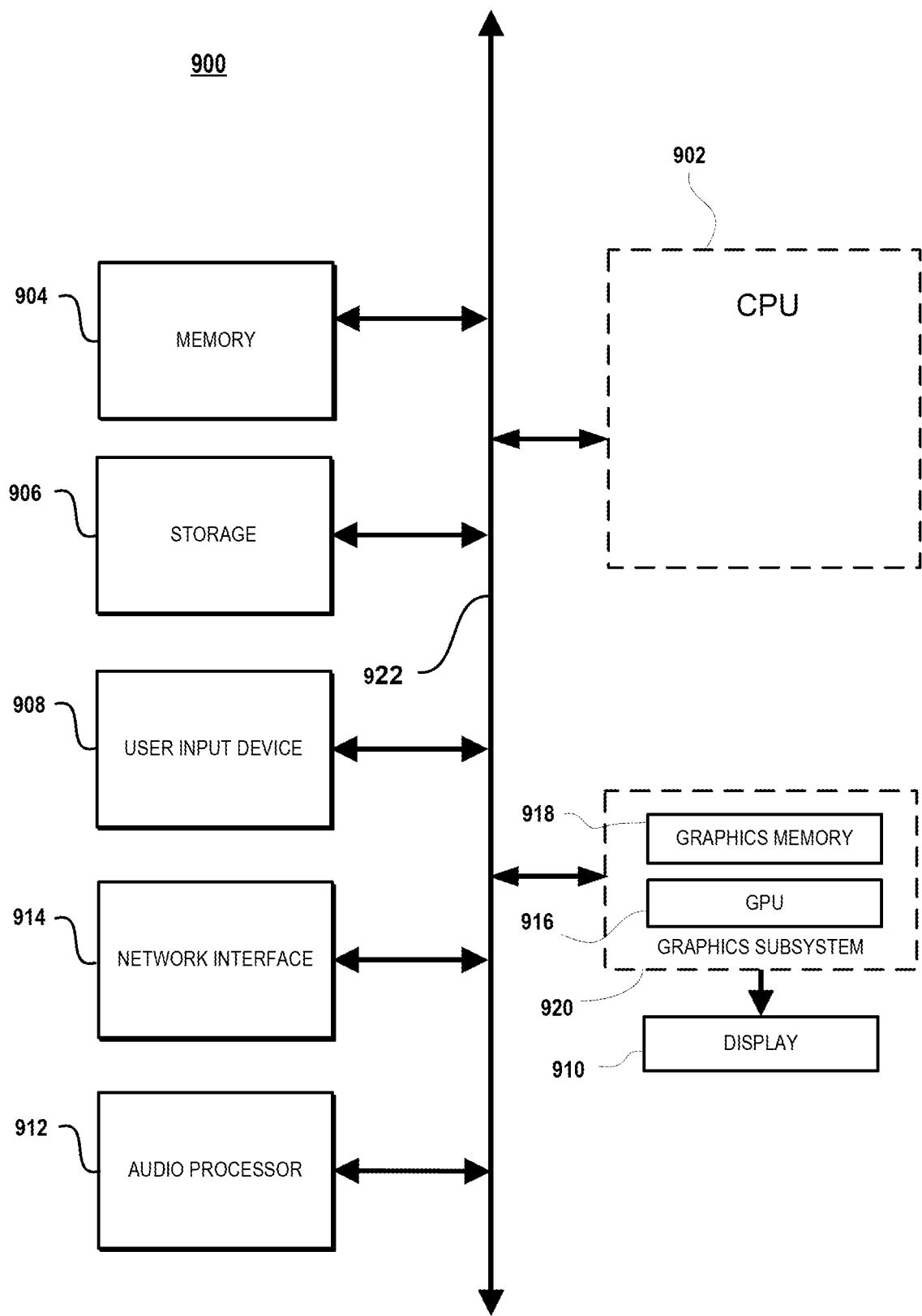
FIG. 9 illustrates components of an example device that can be used to perform aspects of the various embodiments of the present disclosure.

FIG. 9 illustrates components of an example device 900 that can be used to perform aspects of the various embodiments of the present disclosure. This block diagram illustrates a device 900 that can incorporate or can be a personal computer, video game console, personal digital assistant, a server or other digital device, suitable for practicing an embodiment of the disclosure. Device 900 includes a central processing unit (CPU) 902 for running software applications and optionally an operating system. CPU 902 may be comprised of one or more homogeneous or heterogeneous processing cores. For example, CPU 902 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 900 may be a localized to a player playing a game segment (e.g., game console), or remote from the player (e.g., back-end server processor), or one of many servers using virtualization in a game cloud system for remote streaming of gameplay to clients.

Memory 904 stores applications and data for use by the CPU 902. Storage 906 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 908 communicate user inputs from one or more users to device 900, examples of which may include keyboards, mice, joysticks, touch pads, touch screens, still or video recorders/cameras, tracking devices for recognizing gestures, and/or microphones. Network interface 914 allows device 900 to communicate with other computer systems via an electronic communications network, and may include wired or wireless communication over local area networks and wide area networks such as the internet. An audio processor 912 is adapted to generate analog or digital audio output from instructions and/or data provided by the CPU 902, memory 904, and/or storage 906. The components of device 900, including CPU 902, memory 904, data storage 906, user input devices 908, network interface 910, and audio processor 912 are connected via one or more data buses 922.

A graphics subsystem 920 is further connected with data bus 922 and the components of the device 900. The graphics subsystem 920 includes a graphics processing unit (GPU) 916 and graphics memory 918. Graphics memory 918 includes a display memory (e.g., a frame buffer) used for storing pixel data for each pixel of an output image. Graphics memory 918 can be integrated in the same device as GPU 908, connected as a separate device with GPU 916, and/or implemented within memory 904. Pixel data can be provided to graphics memory 918 directly from the CPU 902. Alternatively, CPU 902 provides the GPU 916 with data and/or instructions defining the desired output images, from which the GPU 916 generates the pixel data of one or more output images. The data and/or instructions defining the desired output images can be stored in memory 904 and/or graphics memory 918. In an embodiment, the GPU 916 includes 3D rendering capabilities for generating pixel data for output images from instructions and data defining the geometry, lighting, shading, texturing, motion, and/or camera parameters for a scene. The GPU 916 can further include one or more programmable execution units capable of executing shader programs.

The graphics subsystem 914 periodically outputs pixel data for an image from graphics memory 918 to be displayed on display device 910. Display device 910 can be any device capable of displaying visual information in response to a signal from the device 900, including CRT, LCD, plasma, and OLED displays. Device 900 can provide the display device 910 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method, comprising:
   generating an augmented reality (AR) scene for rendering on a display, the AR scene includes a real-world space and virtual objects projected in the real-world space;
   analyzing a field of view into the AR scene, the analyzing is configured to detect an action by a hand of a user when reaching into the AR scene; and
   generating one or more artificial intelligence elements (AIEs) rendered as virtual objects in the AR scene, each AIE is configured to provide a dynamic interface that is selectable by a gesture of the hand of the user;
   wherein each of the AIEs is rendered proximate to a real-world object present in the real-world space, the real-world object is located in a direction of where the hand of the user is detected to be reaching when the user makes the action by the hand;
   wherein the dynamic interface provides information related to the real-world object, said information is contextually related to the real-world object, and the AIE is rendered proximate to the real-world object to highlight a feature associated with the real-world object responsive to detecting the reaching by the hand of the user toward the real-world object.

2. The computer-implemented method of claim 1, wherein said feature enables the real-world object to perform an action associated with the feature when selected by the user.

3. The computer-implemented method of claim 1, wherein the real-world object, when provided with the AIEs, enables use of the real-world object in the AR scene.

4. The computer-implemented method of claim 1, wherein the AIEs are updated when the user is detected to reach toward another real-world object in the AR scene, said updated AIEs cause the AIEs to move from an initial position in the AR scene to an adjusted position in the AR scene.

5. The computer-implemented method of claim 1, wherein additional AIEs are rendered proximate to the hand of the user when reaching into the AR scene.

6. The computer-implemented method of claim 1, wherein the gesture of the hand of the user is determined to select the dynamic interface of an AIE, the selection of the AIE triggers an update to the AIEs rendered for providing additional AIEs for selection by additional one or more gestures.

7. The computer-implemented method of claim 6, wherein the additional AIEs are related to the selected dynamic interface of the AIE.

8. The computer-implemented method of claim 1, wherein the one or more AIEs are predicted to be preferred by the user.

9. The computer-implemented method of claim 1, wherein the generated AIEs is based on learning AIEs selected by the user in one or more prior interactions with AR interactive content.

10. The computer-implemented method of claim 1, wherein the generated AIEs is based on processing a profile of the user, physical actions of the user, and contextual data through model of the user, the model configured to identify features from the profile of the user, the physical actions of the user, and the contextual data to classify attributes of the user, the attributes of the user being used to select the AIEs.

11. The computer-implemented method of claim 10, wherein the physical actions of the user include voice associated with the user, eye gaze associated with the user, body movement associated with the user, the gesture of the hand of the user, or a combination of two or more thereof.

12. The computer-implemented method of claim 1, wherein the action by the hand of the user can be detected based on eye gaze associated with the user, body movement associated with the user, or a combination of two or more thereof.

13. A system for displaying an augmented reality (AR) scene, the system comprising:
    an AR head mounted display (HMD), said AR HMD includes a display for rendering the AR scene, said AR scene includes a real-world space and virtual objects projected in the real-world space; and analyzing a field of view into the AR scene, the analyzing is configured to detect an action by a hand of a user when reaching into the AR scene; and
    a processing unit associated with the AR HMD for processing one or more artificial intelligence elements (AIEs) rendered as virtual objects in the AR scene, each AIE is configured to provide a dynamic interface that is selectable by a gesture of a hand of a user;
    wherein each of the AIEs is rendered proximate to a real-world object present in the real-world space, the real-world object is located in a direction of where the hand of the user is detected to be reaching when the user makes an action by the hand;
    wherein the dynamic interface provides information related to the real-world object, said information is contextually related to the real-world object, and the AIE is rendered proximate to the real-world object to highlight a feature associated with the real-world object responsive to detecting the reaching by the hand of the user toward the real-world object.

14. The system of claim 13, wherein said feature enables the real-world object to perform an action associated with the feature when selected by the user.

15. The system of claim 13, wherein the real-world object, when provided with the AIEs, enables use of the real-world object in the AR scene.

16. The system of claim 13, wherein the AIEs are updated when the user is detected to reach toward another real-world object in the AR scene, said updated AIEs cause the AIEs to move from an initial position in the AR scene to an adjusted position in the AR scene.

17. The system of claim 13, wherein the generated AIEs is based on processing a profile of the user, physical actions of the user, and contextual data through model of the user, the model configured to identify features from the profile of the user, the physical actions of the user, and the contextual data to classify attributes of the user, the attributes of the user being used to select the AIEs.

18. The system of claim 17, wherein the physical actions of the user include voice associated with the user, eye gaze associated with the user, body movement associated with the user, the gesture of the hand of the user, or a combination of two or more thereof.

\* \* \* \* \*